(12) United States Patent
Jiang

(10) Patent No.: US 12,035,171 B2
(45) Date of Patent: Jul. 9, 2024

(54) METHOD AND DEVICE FOR TRANSMITTING LOAD BALANCING FACTORS

(71) Applicant: BEIJING XIAOMI MOBILE SOFTWARE CO., LTD., Beijing (CN)

(72) Inventor: Xiaowei Jiang, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 628 days.

(21) Appl. No.: 17/272,840

(22) PCT Filed: Sep. 4, 2018

(86) PCT No.: PCT/CN2018/104005
§ 371 (c)(1),
(2) Date: Mar. 2, 2021

(87) PCT Pub. No.: WO2020/047752
PCT Pub. Date: Mar. 12, 2020

(65) Prior Publication Data
US 2021/0314816 A1 Oct. 7, 2021

(51) Int. Cl.
*H04W 28/08* (2023.01)

(52) U.S. Cl.
CPC .................... *H04W 28/08* (2013.01)

(58) Field of Classification Search
None
See application file for complete search history.

(56) References Cited

U.S. PATENT DOCUMENTS

| 2016/0143035 | A1 | 5/2016 | Xue et al. |
| 2017/0265115 | A1 | 9/2017 | Sivavakeesar |
| 2019/0222404 | A1* | 7/2019 | Ang ..................... H04L 5/0096 |
| 2019/0297514 | A1* | 9/2019 | Pao ........................ H04W 36/06 |
| 2020/0029298 | A1* | 1/2020 | Lin ....................... H04W 76/27 |
| 2020/0374725 | A1* | 11/2020 | Chen ..................... H04L 5/0053 |
| 2021/0153245 | A1* | 5/2021 | Tooher .................. H04W 74/008 |

FOREIGN PATENT DOCUMENTS

| CN | 102111813 | A | 6/2011 |
| CN | 102340824 | A | 2/2012 |
| CN | 103327533 | A | 9/2013 |
| CN | 105554818 | A | 5/2016 |
| CN | 106559197 | A | 4/2017 |
| CN | 106664651 | A | 5/2017 |
| JP | 2000224650 | A | 8/2000 |

OTHER PUBLICATIONS

International Search Report in the international application No. PCT/CN2018/104005, mailed on Jun. 3, 2019, 2 pgs.
English translation of the Written Opinion of the International Search Authority in the international application No. PCT/CN2018/104005, mailed on Jun. 3, 2019, 3 pgs.
First Office Action of the Chinese application No. 201880001671.6, issued on Jun. 17, 2021, 16 pgs.

* cited by examiner

*Primary Examiner* — Nguyen H Ngo
(74) *Attorney, Agent, or Firm* — Cooper Legal Group, LLC

(57) ABSTRACT

Provided are a method and device for transmitting load balancing factors. The method includes generating a system message, the system message including load balancing factors of each Bandwidth Part (BWP); and sending the system message by broadcasting.

19 Claims, 10 Drawing Sheets

METHOD AND DEVICE FOR TRANSMITTING LOAD BALANCING FACTORS

CROSS-REFERENCE TO RELATED APPLICATION

This application is a US national stage of International Patent Application No. PCT/CN2018/104005 filed on Sep. 4, 2018, the content of which is hereby incorporated in its entirety.

TECHNICAL FIELD

The present disclosure relates to the technical field of communication, and more particularly, to a method and device for transmitting load balancing factors.

BACKGROUND

In related technologies, load balancing of User Equipment (UE) is always important for a mobile communication system. A redistribution factor may be transmitted between a network side and UE, and the UE may carry out a cell-level redistribution, i.e. a cell reselection, based on the redistribution factor to achieve cell-level load balancing. However, the cell-level load balancing has been unable to meet demand.

SUMMARY

The embodiments of the present disclosure provide a method and device for transmitting load balancing factors. The technical solutions are as follows.

According to a first aspect of the embodiments of the present disclosure, a method for transmitting load balancing factors is provided, which is applied to a base station and includes:

generating a system message, the system message comprising load balancing factors of each Bandwidth Part (BWP); and sending the system message by broadcasting.

The technical solution provided by the embodiments of the present disclosure may include the following beneficial effect that load balancing factors are configured for BWPs, which helps UE to achieve BWP-level load balancing and is beneficial for reduction of congestion.

In an embodiment, the load balancing factors may at least include one of the following:

load balancing factors of respective BWPs of a local cell;
load balancing factors of respective BWPs of an adjacent cell with a same frequency as the local cell; and
load balancing factors of respective BWPs of an adjacent cell with a different frequency from the local cell.

The technical solution provided by the embodiments of the present disclosure may include the following beneficial effect that BWP-level load balancing may be achieved for both a local cell and an adjacent cell thereof.

In an embodiment, the system message may further include a Cellular Global Identity (CGI).

The technical solution provided by the embodiments of the present disclosure may include the following beneficial effect that a CGI may be provided for a cell, which reduces occupied CGI resources.

In an embodiment, the system message may further include frequency information corresponding to each BWP.

The technical solution provided by the embodiments of the present disclosure may include the following beneficial effect that frequency information of each BWP may be informed to UE to facilitate the UE to search for a SS/PBCH Block (SSB) on a corresponding frequency point.

In an embodiment, the frequency information may at least include one of the following:

an Absolute Radio Frequency Channel Number (ARFCN);
a first offset value relative to a center frequency of a corresponding cell; and
a second offset value relative to a frequency of the system message.

The technical solution provided by the embodiments of the present disclosure may include the following beneficial effect that a variety of frequency information may be provided to adapt to a variety of application scenarios.

In an embodiment, the system message may further include corresponding relationships between the load balancing factors of each BWP and a value range of a UE Identity (ID).

The technical solution provided by the embodiments of the present disclosure may include the following beneficial effect that provide corresponding relationships between the load balancing factors of each BWP and the value range of the UE ID, which facilitates flexible configuration of the value range of the UE ID.

In an embodiment, the system message may further include a first indication bit configured to indicate whether it is needed to wait for a notification from paging signaling for redistribution.

The technical solution provided by the embodiments of the present disclosure may include the following beneficial effect that whether to carry out redistribution and whether to carry out redistribution at once may be implemented selectively through the first indication bit.

In an embodiment, the method may further include:

sending paging signaling, the paging signaling including a second indication bit configured to indicate whether to carry out redistribution.

The technical solution provided by the embodiments of the present disclosure may include the following beneficial effect that whether to carry out redistribution may be implemented selectively through the second indication bit.

In an embodiment, when the second indication bit indicates that the redistribution is to be carried out, the paging signaling may further include a third indication bit configured to indicate whether to carry out the redistribution with a BWP level.

The technical solution provided by the embodiments of the present disclosure may include the following beneficial effect that whether to carry out the redistribution with a BWP level may be implemented selectively through the third indication bit.

According to a second aspect of the embodiments of the present disclosure, a method for transmitting load balancing factors is provided, which is applied to a UE and includes:

receiving a system message from a base station, the system message comprising load balancing factors of each Bandwidth Part (BWP);
determining a target BWP based on a local UE Identity (ID) and the load balancing factors of each BWP; and
selecting the target BWP based on reselection.

In an embodiment, the load balancing factors may at least include one of the following:

load balancing factors of respective BWPs of a local cell;

load balancing factors of respective BWPs of an adjacent cell with a same frequency as the local cell; or load balancing factors of respective BWPs of an adjacent cell with a different frequency from the local cell.

Determining the target BWP based on the local UE ID and the load balancing factors of each BWP may include:

determining a target cell and the target BWP based on the local UE ID and the load balancing factors of each BWP.

In an embodiment, when the load balancing factors include load balancing factors of respective BWPs of at least two cells, determining the target cell and the target BWP based on the local UE ID and the load balancing factors of each BWP may include:

determining a sum of the load balancing factors of respective BWPs of each cell;

determining the target cell based on the sum of the load balancing factors of respective BWPs of each cell; and determining the target BWP in the target cell based on the local UE ID and the load balancing factors of respective BWPs of the target cell.

In an embodiment, determining the target BWP based on the local UE ID and the load balancing factors of each BWP may include:

determining a ratio of the load balancing factors of each BWP to a sum of the load balancing factors;

determining multiple value ranges of UE IDs according to the ratio of each BWP; and determining the target BWP based on a value range to which the local UE ID belongs.

In an embodiment, the system message may further include corresponding relationships between the load balancing factors of each BWP and value ranges of UE IDs.

Determining multiple value ranges of the UE IDs according to the ratio of each BWP may include:

determining multiple value ranges of the UE IDs according to the corresponding relationships between the load balancing factors of each BWP and the value ranges of the UE IDs, and the ratio of each BWP.

In an embodiment, the system message may further include a first indication bit configured to indicate whether it is needed to wait for a notification from paging signaling for redistribution.

Selecting the target BWP based on reselection may include:

When the first indication bit indicates that it is needed to wait for a notification from paging signaling for redistribution, selecting the target BWP based on reselection after the paging signaling is received.

In an embodiment, the paging signaling may include a second indication bit configured to indicate whether to carry out redistribution and further include a third indication bit configured to indicate whether to carry out the redistribution with a BWP level.

Selecting the target BWP based on reselection may include:

when the second indication bit indicates that redistribution is to be carried out, and the third indication bit indicates that the redistribution is to be carried out with the BWP level, selecting the target BWP based on reselection.

In an embodiment, after the target BWP is determined, the method may further include:

starting a preset timer after determining the target BWP; and before the timer times out, taking the target BWP as the target BWP for reselection when reselection is needed again.

In an embodiment, the system message may further include a CGI of a cell.

In an embodiment, the system message may further include frequency information corresponding to each BWP.

In an embodiment, the frequency information may at least include one of the following:

an ARFCN;

a first offset value relative to a center frequency of a corresponding cell; or a second offset value relative to a frequency of the system message.

According to a third aspect of the embodiments of the present disclosure, a device for transmitting load balancing factors is provided, which is applied to a base station and includes: a generating module and a first sending module.

The generating module is configured to generate a system message, the system message including the load balancing factors of each BWP.

The first sending module is configured to send the system message by broadcasting.

In an embodiment, the load balancing factors may at least include one of the following:

load balancing factors of respective BWPs of a local cell;

load balancing factors of respective BWPs of an adjacent cell with a same frequency as the local cell; or load balancing factors of respective BWPs of an adjacent cell with a different frequency from the local cell.

In an embodiment, the system message may further include a CGI of a cell.

In an embodiment, the system message may further include frequency information corresponding to each BWP.

In an embodiment, the frequency information may at least include one of the following:

an ARFCN;

a first offset value relative to a center frequency of a corresponding cell; or a second offset value relative to a frequency of the system message.

In an embodiment, the system message may further include corresponding relationships between the load balancing factors of each BWP and a value range of a UE ID.

In an embodiment, the system message may further include a first indication bit configured to indicate whether it is needed to wait for a notification from paging signaling for redistribution.

In an embodiment, the device may further include a second sending module.

The second sending module is configured to send paging signaling, the paging signaling including a second indication bit configured to indicate whether to carry out redistribution.

In an embodiment, when the second indication bit indicates that the redistribution is to be carried out, the paging signaling may further include a third indication bit configured to indicate whether to carry out the redistribution with a BWP level.

According to a fourth aspect of the embodiments of the present disclosure, a device for transmitting load balancing factors is provided, which is applied to a UE and includes: a receiving module, a determining module and a first reselecting module.

The receiving module is configured to receive a system message from a base station, the system message including load balancing factors of each BWP.

The determining module is configured to determine a target BWP based on a local UE ID and load balancing factors of each BWP.

The first reselecting module is configured to select the target BWP based on reselection.

In an embodiment, the load balancing factors may at least include one of the following:
load balancing factors of respective BWPs of a local cell;
load balancing factors of respective BWPs of an adjacent cell with a same frequency as the local cell; or
load balancing factors of respective BWPs of an adjacent cell with a different frequency from the local cell.

The determining module may include a determining submodule.

The determining submodule is configured to determine the target cell and the target BWP based on the local UE ID and the load balancing factors of each BWP.

In an embodiment, the load balancing factors may include load balancing factors of respective BWPs of at least two cells. The determining submodule is configured to determine a sum of the load balancing factors of respective BWPs of each cell, determine the target cell based on the sum of the load balancing factors of respective BWPs of each cell, and determine the target BWP in the target cell based on the local UE ID and the load balancing factors of respective BWPs of the target cell.

In an embodiment, the determining module may include: a ratio submodule, a range submodule and a BWP submodule.

The ratio submodule is configured to determine a ratio of the load balancing factors of each BWP to a sum of the load balancing factors.

The range submodule is configured to determine multiple value ranges of UE IDs according to the ratio of each BWP.

The BWP submodule is configured to determine the target BWP based on a value range to which the local UE ID belongs.

In an embodiment, the system message may further include corresponding relationships between the load balancing factors of each BWP and value ranges of UE IDs.

The range submodule is configured to determine multiple value ranges of the UE IDs according to the corresponding relationships between the load balancing factors of each BWP and the value ranges of the UE IDs, and the ratio of each BWP.

In an embodiment, the system message may further include a first indication bit configured to indicate whether it is needed to wait for a notification from paging signaling for redistribution.

The first reselecting module may include a first reselecting submodule.

The first reselecting submodule is configured to, when the first indication bit indicates that it is needed to wait for a notification from paging signaling for redistribution, select the target BWP based on reselection after the paging signaling is received.

In an embodiment, the paging signaling may include a second indication bit configured to indicate whether to carry out redistribution and further include a third indication bit configured to indicate whether to carry out the redistribution with a BWP level.

The first reselecting module may include a second reselecting submodule.

The second reselecting submodule is configured to, when the second indication bit indicates that redistribution is to be carried out and the third indication bit indicates that the redistribution is to be carried out with the BWP level, select the target BWP based on reselection.

In an embodiment, the device may further include: a starting module and a second reselecting module.

The starting module is configured to start the preset timer.

The second reselecting module is configured to, before the timer times out, take the target BWP as the target BWP for reselection when reselection is needed again.

In an embodiment, the system message may further include a CGI of a cell.

In an embodiment, the system message may further include frequency information corresponding to each BWP.

In an embodiment, the frequency information may at least include one of the following:
an ARFCN;
a first offset value relative to a center frequency of a corresponding cell; and
a second offset value relative to a frequency of the system message.

In an embodiment, the system message may further include corresponding relationships between the load balancing factors of each BWP and value ranges of UE IDs.

According to a fifth aspect of the embodiments of the present disclosure, a device for transmitting load balancing factors is provided, which may include:
a processor; and
a memory configured to store an instruction executable for the processor.

The processor is configured to:
generate a system message, the system message including load balancing factors of each BWP; and
send the system message by broadcasting.

According to a sixth aspect of the embodiments of the present disclosure, a device for transmitting load balancing factors is provided, which may include:
a processor; and
a memory configured to store an instruction executable for the processor.

The processor is configured to:
receive a system message from the base station, the system message including the load balancing factors of each BWP;
determine a target BWP based on the local UE ID and load balancing factors of each BWP; and
select the target BWP based on reselection.

According to a seventh aspect of the embodiments of the present disclosure, a computer-readable storage medium is provided, on which a computer instruction is stored. The instruction, when executed by a processor, implements the method at the base station side.

According to an eighth aspect of the embodiments of the present disclosure, a computer-readable storage medium is provided, on which a computer instruction is stored. The instruction, when executed by a processor, implements the method at the UE side.

It is to be understood that the above general descriptions and detailed descriptions below are only exemplary and explanatory and not intended to limit the present disclosure.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects related to the present disclosure as recited in the appended claims.

In related technologies, a redistribution factor is transmitted between a network side and UE, and the UE may carry out cell-level redistribution, i.e. cell reselection, based on the redistribution factor to achieve cell-level load balancing. However, the cell-level load balancing has been unable to meet demands. It is found that UE needs to select an initial BWP to reside after a target cell is selected based on cell reselection. The UE may select the initial BWP by searching for SSBs on each BWP from high to low frequency or from low to high frequency. A BWP where an SSB is found for the first time is the selected initial BWP. Since all UEs search SSBs in a same frequency order, multiple UEs are likely to select the same initial BWP, causing congestion to that BWP.

To solve the above problem, the embodiments provide a solution of configuring a load balancing factor for a BWP in a cell to achieve BWP-level load balancing and reduce congestion.

Figure 1:
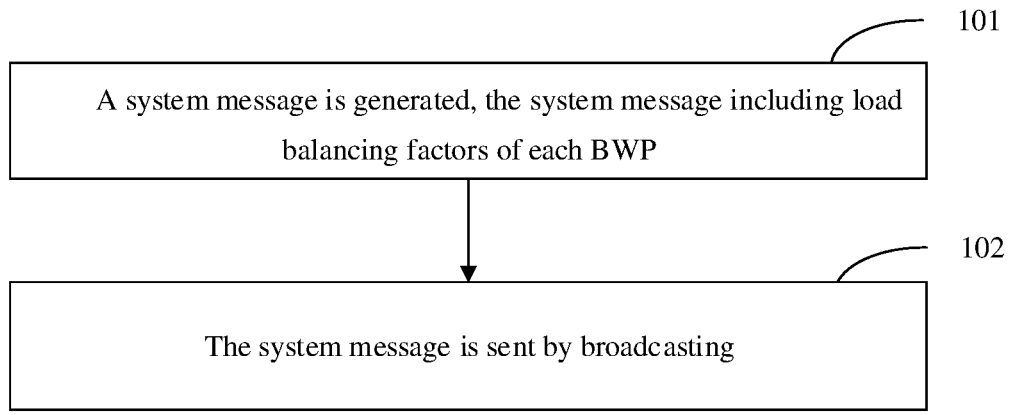
FIG. 1 is a flowchart of a method for transmitting load balancing factors according to an exemplary embodiment.

FIG. 1 is a flowchart of a method for transmitting load balancing factors according to an exemplary embodiment. The method for transmitting load balancing factors is applied to an access network device like a base station. As shown in FIG. 1, the method may include the following Operation 101 to Operation 102.

At Operation 101, a system message is generated, the system message including the load balancing factors of each BWP.

At Operation 102, the system message is sent by broadcasting.

In this embodiment, a base station may configure load balancing factors for each BWP and broadcast them to UE through a system message, so that the UE selects a BWP based on the load balancing factors during reselection to reduce congestion.

The load balancing factors may be carried in a System Information Block (SIB) in the system message.

The base station may also send a redistribution factor to the UE.

In an embodiment, the load balancing factors at least include one of the following:

load balancing factors of respective BWPs of a local cell;
load balancing factors of respective BWPs of an adjacent cell with a same frequency as the local cell; or
load balancing factors of respective BWPs of an adjacent cell with a different frequency from the local cell.

In this embodiment, the base station may configure load balancing factors of BWPs for a cell where the UE currently resides (i.e., the local cell), and may also configure load balancing factors of BWPs for an adjacent cell with a same-frequency as or a different frequency from the local cell. During reselection, the UE may select the local cell or an adjacent cell. No matter which cell the UE selects, BWP-level load balancing can be achieved.

In a case that the base station sends load balancing factors of BWPs of a cell only, the UE can only target the cell as a target cell. In a case that the base station sends load balancing factors of BWPs of multiple cells, the UE may select one cell from the multiple cells as a reselected target cell. Then, the UE may select a BWP to search for an SSB based on the load balancing factor of the BWP of the target cell.

In an embodiment, the SIB may include SIB2, and the SIB2 includes load balancing factors of respective BWPs of the local cell.

The SIB may include SIB3, and the SIB3 includes load balancing factors of respective BWPs of an adjacent cell with a same frequency as the local cell.

The SIB may include SIB4, and the SIB4 includes load balancing factors of respective BWPs of an adjacent cell with a different frequency from the local cell.

In this embodiment, load balancing factors of respective BWPs of each cell may be transmitted through different SIBs. Each SIB may be transmitted through the same system message or through multiple system messages. After receiving all the system messages, the UE may carry out reselection.

In an embodiment, the system message may further include a CGI of a cell.

In this embodiment, one CGI is configured for one cell, which saves CGI resources. One Physical Cell ID (PCI) may also be configured for one cell in this embodiment, which saves PCI resources. The PCI may be sent through the system message. For example, the CGI and the PCI may be transmitted through the SIB2.

In an embodiment, the system message may further include frequency information corresponding to each BWP.

For example, the frequency information corresponding to each BWP may be transmitted through the SIB2.

In this embodiment, the base station may notify the UE of the frequency information corresponding to each BWP through the system message, which is convenient for the UE to search for the SSB at the corresponding frequency point based on the frequency information after determining the target BWP.

In an embodiment, the frequency information may at least include one of the following:
- an ARFCN;
- a first offset value relative to a center frequency of a corresponding cell; or
- a second offset value relative to a frequency of the system message.

A variety of frequency information may be provided in the embodiment to adapt to a variety of application scenarios. The base station and the UE may adopt the same policy without additional notification of which policy is adopted.

The ARFCN directly indicates a specific frequency point, and thus the UE can directly know the frequency point, which is an absolute value.

With respect to the first offset value, as mentioned in the above embodiments, load balancing factors of each BWP may be configured for both the local cell and an adjacent cell. The UE may know a cell corresponding to a BWP and a center frequency of the cell, so an actual frequency point, which is an absolute value, may be determined based on the first offset value corresponding to the BWP and the center frequency of the cell.

With respect to the second offset value, the system message should be transmitted at a certain frequency. When receiving the system message, the UE may know the frequency of the system message, so the actual frequency point of each BWP may be known in combination with the second offset value corresponding to each BWP.

In an embodiment, the system message may further include corresponding relationships between the load balancing factors of each BWP and value ranges of UE IDs.

For example, the corresponding relationships between the load balancing factors of each BWP and the value ranges of the UE IDs may be transmitted through the SIB2.

In this embodiment, a size of a load balancing factor has an impact on a size of a value range of a UE ID. Flexible configuration of the corresponding relationships between the load balancing factors of each BWP and the value ranges of the UE IDs is equivalent to flexible configuration of a size of respective value ranges of UE IDs and control of the maximum number of UEs on each BWP.

In an embodiment, the system message may further include a first indication bit configured to indicate whether it is needed to wait for a notification from paging signaling for redistribution.

In this embodiment, after receiving load balancing factors of each BWP, the UE may carry out cell reselection immediately. Or, after receiving load balancing factors of each BWP, the UE does not carry out cell reselection immediately, but waits for the paging signaling, and then carries out cell reselection after receiving the paging signaling. This embodiment adds the first indication bit to the system message to indicate whether the UE needs to wait for the paging signaling. For example, when a value of the first indication bit is 1, which means that the UE needs to wait for paging signaling, the UE does not carry out cell reselection temporarily, but waits for receiving the paging signaling. When a value of the first indication bit is 0, which means that the UE does not need to wait for paging signaling, the UE may carry out cell reselection immediately. The first indication bit may be transmitted through the SIB2 in this embodiment.

In this embodiment, whether to carry out redistribution is flexibly configured through the first indication bit.

In an embodiment, the method may further include Operation A.

At Operation A, paging signaling is sent, the paging signaling including a second indication bit configured to indicate whether to carry out redistribution.

In this embodiment, the paging signaling may indicate redistribution. Thus, the UE may carry out cell reselection immediately after receiving the paging signaling. Or, whether to carry out redistribution, i.e. cell reselection, may also be controlled again through the paging signaling. In this embodiment, the second indication bit is added to the paging signaling. For example, when a value of the second indication bit is 1, which means that redistribution is to be carried out, the UE may carry out cell reselection immediately after receiving the paging signaling. When a value of the second indication bit is 0, which means that redistribution is not to be carried out, the UE does not carry out cell reselection.

In this embodiment, whether to carry out redistribution may be flexibly configured through the second indication bit.

In an embodiment, when the second indication bit indicates that redistribution is to be carried out, the paging signaling may further include a third indication bit configured to indicate whether to carry out the redistribution with a BWP level.

In this embodiment, the cell-level redistribution may be carried out, and the redistribution with a BWP level may also be carried, which is flexibly controlled through the third indication bit.

The implementation process at the base station is described in detail through an embodiment below.

Figure 2:
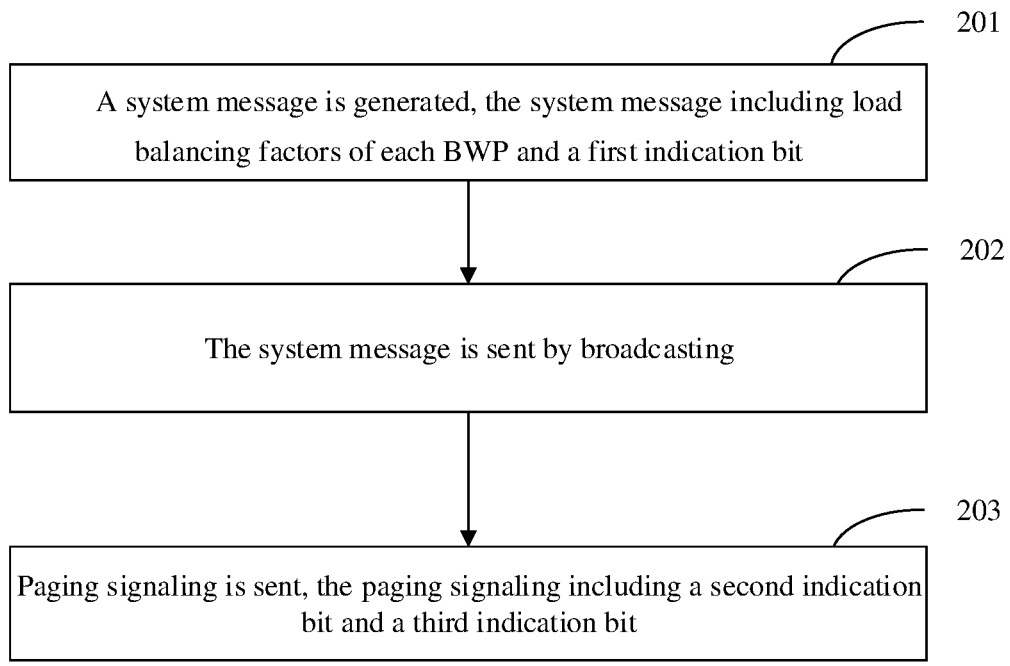
FIG. 2 is a flowchart of a method for transmitting load balancing factors according to an exemplary embodiment.

FIG. 2 is a flowchart of a method for transmitting load balancing factors according to an exemplary embodiment. The method for transmitting load balancing factors is applied to the access network devices like a base station. As shown in FIG. 2, the method may include the following Operation 201 to Operation 203.

At Operation 201, a system message is generated, the system message including load balancing factors of each BWP and the first indication bit. The first indication bit indicates that it is needed to wait for a notification from paging signaling for redistribution.

At Operation 202, the system message is sent by broadcasting.

At Operation 203, paging signaling is sent, the paging signaling including the second indication bit and the third indication bit. The second indication bit indicates that redistribution is to be carried out. The third indication bit indicates that the redistribution is to be carried out with a BWP level.

The implementation process on the base station side is described above. Correspondingly, UE also has the corresponding improvement. The implementation process on the UE side is described below.

Figure 3:
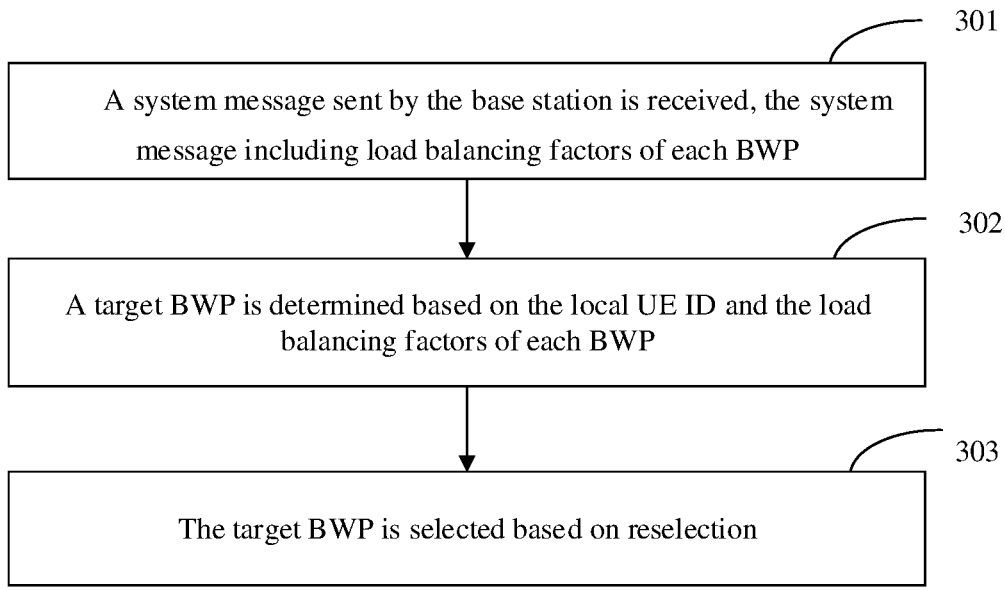
FIG. 3 is a flowchart of a method for transmitting load balancing factors according to an exemplary embodiment.

FIG. 3 is a flowchart of a method for transmitting load balancing factors according to an exemplary embodiment. The method for transmitting load balancing factors is applied to UE. The UE may be a mobile phone, a computer, a digital broadcast terminal, a messaging device, a gaming console, a tablet, a medical device, exercise equipment, a personal digital assistant, etc. As shown in FIG. 3, the method may include the following Operation 301 to Operation 303.

At Operation 301, a system message sent by the base station is received, the system message including load balancing factors of each BWP.

At Operation 302, a target BWP is determined based on a local UE ID and the load balancing factors of each BWP.

At Operation 303, the target BWP is selected based on reselection.

In this embodiment, after receiving load balancing factors of each BWP, the UE may determine a value range of a UE ID corresponding to each BWP based on the load balancing factors of each BWP. Then, a value range to which the local UE ID belongs may be determined, and then the corresponding BWP, i.e. the target BWP, may be determined. The target BWP may be selected based on reselection, that is, the target BWP is searched for an SSB. The SSB may be a Cell Defining SSB (CD-SSB) that is an SSB associated with Remaining System Information (RMSI).

In this embodiment, an initial BWP of each UE may be distinguished based on load balancing factors of each BWP, which is equivalent to evenly distributing each UE to each BWP as far as possible. In this way, the success rate of searching for an SSB can be improved, synchronization can be completed in time and congestion can be reduced. Of course, there may also be cases where searching for an SSB on the initial BWP is unsuccessful, and then the UE may continue searching for the SSB on other BWPs. There may be a variety of strategies for determining the other BWPs, all of which are applicable to this embodiment, such as preferably selecting other BWPs with adjacent frequencies.

For example, UE ID=K*(IMSI mode L)+1, where values of K and L are agreed by the system and are constant parameters specified by the system.

In an embodiment, the load balancing factors at least include one of the following:
load balancing factors of respective BWPs of a local cell;
load balancing factors of respective BWPs of an adjacent cell with a same frequency as the local cell; or
load balancing factors of respective BWPs of an adjacent cell with a different frequency from the local cell.

Operation 302 includes Operation B.

At Operation B, a target cell and the corresponding target BWP are determined based on the local UE ID and the load balancing factors of each BWP.

In this embodiment, the base station may notify load balancing factors of respective BWPs of one or more cells through the system message. In a case that the base station sends load balancing factors of each BWP of a cell only, the UE can only take the cell as the target cell. When the base station sends load balancing factors of each BWP of multiple cells, the UE may select one cell from the multiple cells as the reselected target cell. Then, the UE may select a BWP as the target BWP based on the load balancing factor of the BWP of the target cell, and search the target BWP for an SSB.

There are several modes to determine the target cell. For example, in mode 1, the base station may also send a redistribution factor, and the UE may determine the target cell based on the redistribution factor. The specific implementation process may refer to the related technologies. For example, in mode 2, the UE may determine the target cell based on load balancing factors of respective BWPs of each cell, and the specific implementation process is shown in the following embodiments.

In an embodiment, BWP-level load balancing may be achieved in both the local cell and an adjacent cell.

In an embodiment, when the load balancing factors include the load balancing factors of respective BWPs of at least two cells, Operation B may include Operation B1, Operation B2 and Operation B3.

At Operation B1, a sum of the load balancing factors of respective BWPs of each cell is determined.

At Operation B2, a target cell is determined based on the sum of the load balancing factors of respective BWPs of each cell.

At Operation B3, a target BWP in the target cell is determined based on the local UE ID and the load balancing factors of respective BWPs of the target cell.

In this embodiment, the sum of the load balancing factors of respective BWPs of each cell is taken as the load balancing factors of the cell. Value ranges of the UE IDs may be determined according to a ratio of load balancing factors of each cell to the sum of the load balancing factors of all the cells. The corresponding cell, i.e. the target cell, may be determined based on a value range to which the local UE ID belongs. Then, the target BWP in the target cell may be determined based on load balancing factors of respective BWPs of the target cell. All the cells are the cells that are notified in the system message.

In an embodiment, Operation 302 may include Operation C1, Operation C2 and Operation C3.

At Operation C1, the ratio of load balancing factors of each BWP to the sum of the load balancing factors is determined.

At Operation C2, multiple value ranges of the UE IDs are determined according to the ratio of each BWP.

At Operation C3, the target BWP is determined based on a value range to which the local UE ID belongs.

For example, the load balancing factors of each BWP are f1, f2 and f3, corresponding to BWP1, BWP2 and BWP3 respectively. The sum of the load balancing factors is S equal to f1+f2+f3. m and n are the minimum and maximum values of a UE ID. The value range 1 is [m, n×f1/S], corresponding to the BWP1. The value range 2 is [n×f1/S, n×(f1+f2)/S), corresponding to the BWP2. The value range 3 is [n×(f1+f2)/S, n), corresponding to the BWP3. The UE determines the value range to which the local UE ID belongs. For example, when the value range falls into the value range 2, then the BWP2 is determined as the target BWP.

For another example, combined with the load balancing factors of respective BWPs of each cell, the load balancing factors of respective BWPs of cell 1 (e.g. the local cell) are f11, f12 and f13, respectively corresponding to BWP11, BWP12 and BWP13 of the cell 1. The sum of the load balancing factors of the cell 1, that is, the sum of the load balancing factors of respective BWPs of the cell 1 is S1 equal to f11+f12+f13.

The load balancing factors of respective BWPs of cell 2 (e.g. a same-frequency adjacent cell) are f21, f22 and f23, respectively corresponding to BWP21, BWP22 and BWP23 of the cell 2. The sum of the load balancing factors of the cell 2, that is, the sum of the load balancing factors of respective BWPs of the cell 2 is S2 equal to f21+f22+f23.

The load balancing factors of respective BWPs of cell 3 (e.g. a different-frequency adjacent cell) are f31, f32 and f33, respectively corresponding to BWP31, BWP32 and BWP33 of the cell 3. The sum of the load balancing factors of the cell 3, that is, the sum of the load balancing factors of respective BWPs of the cell 3 is S3 equal to f31+f32+f33.

The sum of the load balancing factors of respective BWPs of all the cells is SX equal to S1+S2+S3.

m and n are the minimum and maximum values of a UE ID. The value range 1 is [m, n×f11/SX], equivalent to [m, n×(f11/S1)(S1/SX)), corresponding to the BWP11, wherein [m, n×(S1/SX)) corresponds to the cell 1.

The value range 2 is [n×f11/SX, n×(f11+f12)/SX)), corresponding to the BWP12.

The value range 3 is [n×f11+f12)/SX, n×(S1/SX)), corresponding to the BWP13.

The value range 4 is [n×(S1/SX), n×(S1+f21)/SX), corresponding to the BWP21, wherein [n×(S1/SX), n×(S1+S2)/SX) corresponds to the cell 2.

The value range 5 is [n×(S1+f21)/SX, n×(S1+f21+f22)/SX), corresponding to the BWP22.

The value range 6 is [n×(S1+f21+f22)/SX, n×(S1+S2)/SX), corresponding to the BWP23.

The value range 7 is [n×(S1+S2)/SX, n×(S1+S2+f31)/SX), corresponding to the BWP31. [n×(S1+S2)/SX, n] corresponds to the cell 3.

The value range 8 is [n×(S1+S2+f31)/SX, n×(S1+S2+f31+f32)/SX), corresponding to the BWP32.

The value range 9 is [n×(S1+S2+f31+f32)/SX, n], corresponding to the BWP33.

The UE determines the value range to which the local UE ID belongs. For example, if the value range falls into the value range 2, then the cell 1 is taken as the target cell, and the BWP 12 is determined as the target BWP.

In an embodiment, the system message may further include corresponding relationships between the load balancing factors of each BWP and value ranges of UE IDs.

Operation C2 may include Operation C21.

At Operation C21, multiple value ranges of the UE ID are determined according to the corresponding relationships between the load balancing factors of each BWP and the value ranges of the UE IDs, and the ratio of each BWP.

In this embodiment, a size of a load balancing factor has an impact on a size of a value range of a UE ID. Flexible configuration of the corresponding relationships between the load balancing factors of each BWP and the value ranges of the UE IDs is equivalent to flexible configuration of sizes of the value ranges of the UE IDs and control of the maximum number of UEs on each BWP.

In an embodiment, the system message may further include a first indication bit configured to indicate whether it is needed to wait for a notification from paging signaling for redistribution.

Operation 303 may include Operation D.

At Operation D, when the first indication bit indicates that it is needed to wait for a notification from paging signaling for redistribution, the target BWP is selected based on reselection after the paging signaling is received.

In this embodiment, after receiving the system message, the UE may determine a value of the first indication bit in the system message. When the first indication bit indicates that it is needed to wait for a notification from the paging signaling for redistribution, the UE does not carry out redistribution immediately and waits for receiving paging signaling. After receiving the paging signaling, the target BWP is selected based on reselection.

In a case that the first indication bit indicates that it is not needed to wait for a notification from paging signaling for redistribution, the UE carries out redistribution immediately without waiting for receiving the paging signaling.

In a case that the first indication bit indicates that it is needed to wait for a notification from paging signaling for redistribution but the UE never waits for paging signaling, the UE does not need to carry out redistribution.

In an embodiment, the paging signaling may include a second indication bit configured to indicate whether to carry out redistribution and may further include a third indication bit configured to indicate whether to carry out the redistribution with a BWP level.

Selecting the target BWP based on reselection may include Operation E.

At Operation E, when the second indication bit indicates that redistribution is to be carried out and the third indication bit indicates that the redistribution is to be carried out with the BWP level, the target BWP is selected based on reselection.

In this embodiment, after receiving the system message, the UE may determine the value of the first indication bit in the system message. When the first indication bit indicates that it is needed to wait for a notification from paging signaling for redistribution, the UE does not carry out redistribution immediately and waits for receiving the paging signaling. After receiving the paging signaling, the value of the second indication bit in the paging signaling is determined. When the second indication bit indicates that redistribution is to be carried out, the UE may carry out redistribution immediately. Then, which level of redistribution is to be adopted may be determined based on the indication of the third indication bit. When the second indication bit indicates that redistribution is not to be carried out, the UE does not need to carry out redistribution.

In an embodiment, after the target BWP is determined, the method may further include Operation F1 and Operation F2.

At Operation F1, a preset timer is started.

At Operation F2, before the timer times out, the target BWP is taken as the target BWP for reselection when reselection is needed again.

In this embodiment, before the timer times out, the target BWP is taken as the target BWP for reselection when reselection is needed again. That is, the process of determining the target BWP based on the local UE ID and the load balancing factors of respective BWPs of the above embodiments is not needed, so that the target BWP can be selected based on reselection more timely, and equipment resources are saved.

After the timer times out, the above embodiments may be repeated to determine and select the target BWP based on reselection.

In an embodiment, the system message may further include a CGI of a cell.

In this embodiment, one CGI is configured for one cell, which saves CGI resources. In this embodiment, one PCI may also be configured for one cell, which saves PCI resources. The PCI may be sent through the system message. For example, the CGI and the PCI may be transmitted through the SIB2.

In an embodiment, the system message may further include frequency information corresponding to each BWP.

For example, the frequency information corresponding to each BWP may be transmitted through the SIB2.

In this embodiment, the base station may notify the frequency information corresponding to each BWP to the UE through the system message. After determining the target BWP, the UE may easily search for an SSB at a corresponding frequency point based on the frequency information.

In an embodiment, the frequency information may at least include one of the following:

an ARFCN;

a first offset value relative to a center frequency of a corresponding cell; or a second offset value relative to a frequency of the system message.

In this embodiment, a variety of frequency information may be provided to adapt to a variety of application scenarios. The base station and the UE may adopt the same policy without additional notification of which policy is adopted.

The ARFCN directly indicates a specific frequency point, and the UE may directly know the frequency point, which is an absolute value.

With respect to the first offset value, as mentioned in the above embodiments, load balancing factors of each BWP may be configured for both a local cell and an adjacent cell. The UE may know a cell corresponding to a BWP and a center frequency of the cell, so an actual frequency point, which is an absolute value, may be determined based on the first offset value corresponding to the BWP and the center frequency of the cell.

With respect to the second offset value, the system message should be transmitted on a certain frequency. When receiving the system message, the UE may know a frequency of the system message, so the actual frequency point of each BWP may be known in combination with the second offset value corresponding to each BWP.

In an embodiment, the system message may further include corresponding relationships between the load balancing factors of each BWP and value ranges of UE IDs.

For example, the corresponding relationships between the load balancing factors of each BWP and the value ranges of the UE IDs may be transmitted through the SIB2.

In this embodiment, a size of a load balancing factor impacts a size of a value range of a UE ID. Flexible configuration of the corresponding relationships between the load balancing factors of each BWP and the value ranges of the UE IDs is equivalent to flexible configuration of a size of a value range of each UE ID and control of the maximum number of UEs on each BWP.

The implementation process is described in detail through an embodiment below.

Figure 4:
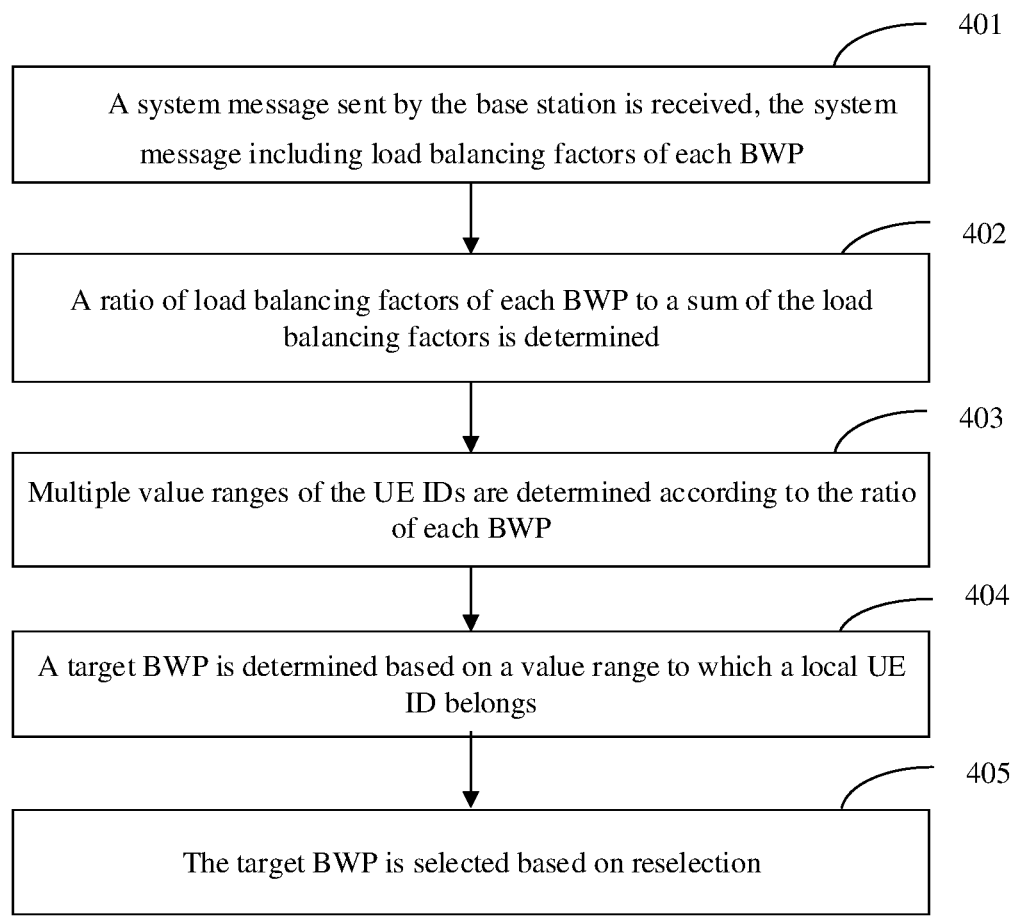
FIG. 4 is a flowchart of a method for transmitting load balancing factors according to an exemplary embodiment.

FIG. 4 is a flowchart of a method for transmitting load balancing factors according to an exemplary embodiment. The method for transmitting load balancing factors is applied to UE. The UE may be a mobile phone, a computer, a digital broadcast terminal, a messaging device, a gaming console, a tablet, a medical device, exercise equipment, a personal digital assistant, etc. As shown in FIG. 4, the method may include the following Operation 401 to Operation 405.

At Operation 401, a system message sent by the base station is received, the system message including the load balancing factors of each BWP.

At Operation 402, a ratio of load balancing factors of each BWP to a sum of the load balancing factors is determined.

At Operation 403, multiple value ranges of UE IDs are determined according to the ratio of each BWP.

At Operation 404, a target BWP is determined based on a value range to which a local UE ID belongs.

At Operation 405, the target BWP is selected based on reselection.

Figure 5:
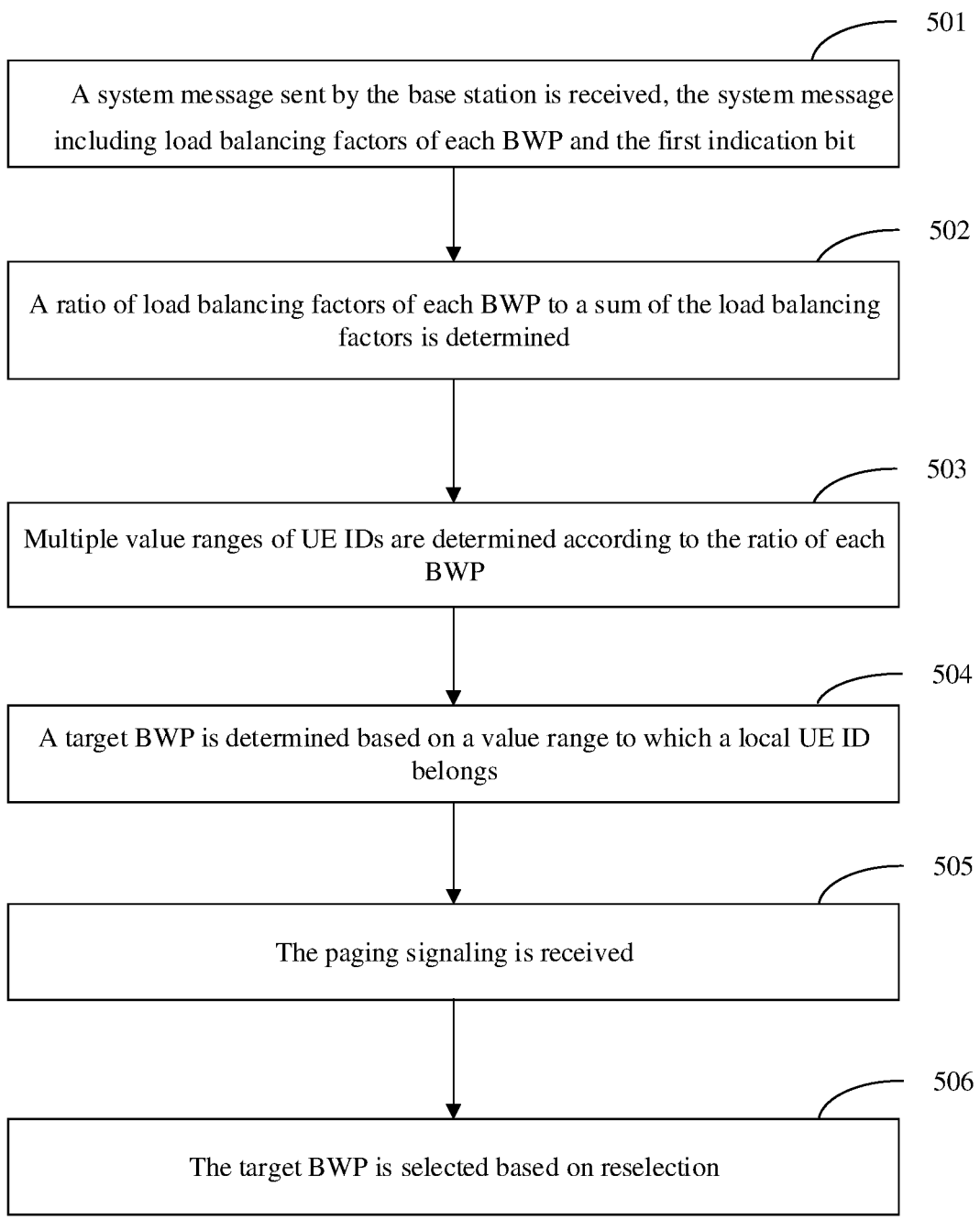
FIG. 5 is a flowchart of a method for transmitting load balancing factors according to an exemplary embodiment.

FIG. 5 is a flowchart of a method for transmitting load balancing factors according to an exemplary embodiment. The method for transmitting load balancing factors is applied to UE. The UE may be a mobile phone, a computer, a digital broadcast terminal, a messaging device, a gaming console, a tablet, a medical device, exercise equipment, a personal digital assistant, etc. As shown in FIG. 5, the method may include the following Operation 501 to Operation 506.

At Operation 501, a system message sent by the base station is received, the system message including the load balancing factors of each BWP and the first indication bit. The first indication bit indicates that it is needed to wait for a notification from paging signaling for redistribution.

At Operation 502, a ratio of load balancing factors of each BWP to a sum of the load balancing factors is determined.

At Operation 503, multiple value ranges of UE IDs are determined according to the ratio of each BWP.

At Operation 504, a target BWP is determined based on a value range to which a local UE ID belongs.

At Operation 505, the paging signaling is received.

At Operation 506, the target BWP is selected based on reselection.

The paging signaling may include a second indication bit and a third indication bit. The UE may determine whether to conduct reselection and the level of reselection according to the indication of the second indication bit and the third indication bit.

After receiving the paging signaling, the UE may carry out Operation 502 to Operation 504 according to the indication of the second indication bit and the third indication bit.

The implementation process is described below in combination with the base station and the UE.

Figure 6:
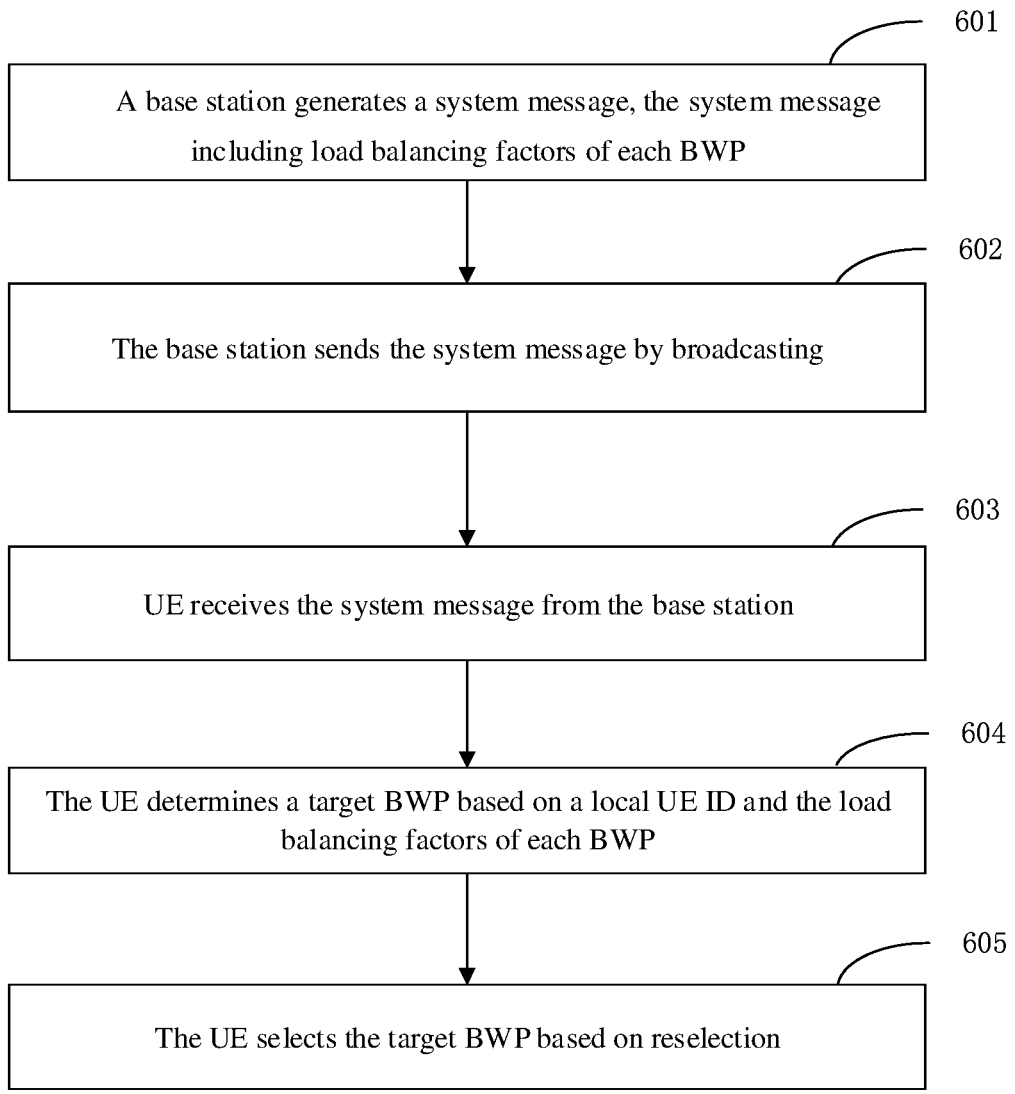
FIG. 6 is a flowchart of a method for transmitting load balancing factors according to an exemplary embodiment.

FIG. 6 is a flowchart of a method for transmitting load balancing factors according to an exemplary embodiment. As shown in FIG. 6, the method may include the following Operation 601 to Operation 605.

At Operation 601, a base station generates a system message, the system message including the load balancing factors of each BWP.

At Operation 602, the base station sends the system message by broadcasting.

At Operation 603, UE receives the system message from the base station.

At Operation 604, the UE determines a target BWP based on a local UE ID and the load balancing factors of each BWP.

At Operation 605, the UE selects the target BWP based on reselection.

The above embodiments may be flexibly combined according to actual needs.

The following is device embodiments of the present disclosure, which may be used to carry out the method embodiments of the present disclosure.

Figure 7:
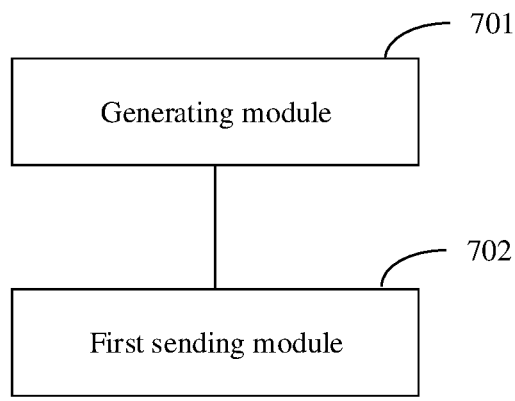
FIG. 7 is a block diagram of a device for transmitting load balancing factors according to an exemplary embodiment.

FIG. 7 is a block diagram of a device for transmitting load balancing factors according to an exemplary embodiment. The device may become part or all of an electronic device through software, hardware, or a combination of the two. When applied to a base station, with reference to FIG. 7, the device for transmitting load balancing factors may include a generating module 701 and a first sending module 702.

The generating module 701 is configured to generate a system message, the system message including the load balancing factors of each BWP.

The first sending module 702 is configured to send the system message by broadcasting.

In an embodiment, the load balancing factors may at least include one of the following:
load balancing factors of respective BWPs of a local cell;
load balancing factors of respective BWPs of an adjacent cell with a same frequency as the local cell; and load balancing factors of respective BWPs of an adjacent cell with a different frequency from the local cell.

In an embodiment, the system message may further include a CGI of a cell.

In an embodiment, the system message may further include frequency information corresponding to each BWP.

In an embodiment, the frequency information may at least include one of the following:
- an ARFCN;
- a first offset value relative to a center frequency of a corresponding cell; or
- a second offset value relative to a frequency of the system message.

In an embodiment, the system message may further include corresponding relationships between the load balancing factors of each BWP and value ranges of UE IDs.

In an embodiment, the system message may further include a first indication bit configured to indicate whether it is needed to wait for a notification from paging signaling for redistribution.

Figure 8:
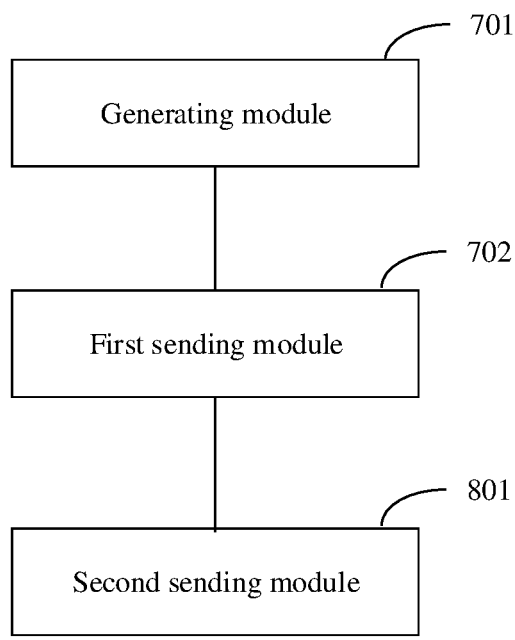
FIG. 8 is a block diagram of a device for transmitting load balancing factors according to an exemplary embodiment.

In an embodiment, as shown in FIG. 8, the device may further include a second sending module 801.

The second sending module 801 is configured to send paging signaling, the paging signaling including a second indication bit configured to indicate whether to carry out redistribution.

In an embodiment, when the second indication bit indicates that redistribution is to be carried out, the paging signaling may further include a third indication bit configured to indicate whether to carry out the redistribution with a BWP level.

Figure 9:
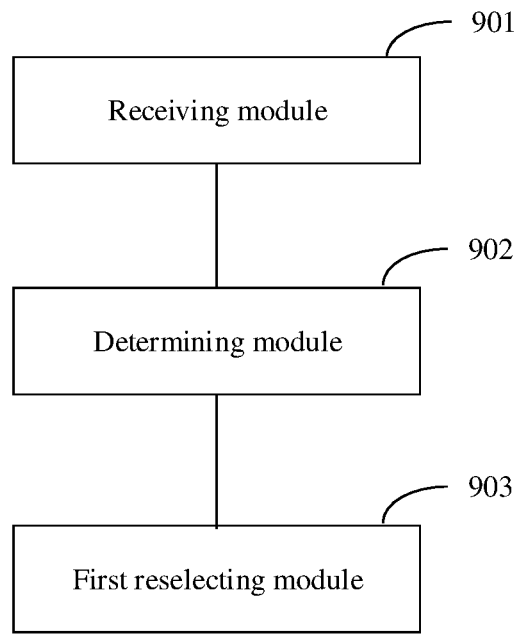
FIG. 9 is a block diagram of a device for transmitting load balancing factors according to an exemplary embodiment.

FIG. 9 is a block diagram of a device for transmitting load balancing factors according to an exemplary embodiment. The device may become part or all of an electronic device through software, hardware, or a combination of the two. When applied to UE, with reference to FIG. 9, the device for transmitting load balancing factors may include: a receiving module 901, a determining module 902 and a first reselecting module 903.

The receiving module 901 is configured to receive a system message from the base station, the system message including load balancing factors of each BWP.

The determining module 902 is configured to determine a target BWP based on a local UE ID and the load balancing factors of each BWP.

The first reselecting module 903 is configured to select the target BWP based on reselection.

In an embodiment, the load balancing factors may at least include one of the following:
- load balancing factors of respective BWPs of a local cell;
- load balancing factors of respective BWPs of an adjacent cell with a same frequency as the local cell; or
- load balancing factors of respective BWPs of an adjacent cell with a different frequency from the local cell.

Figure 10:
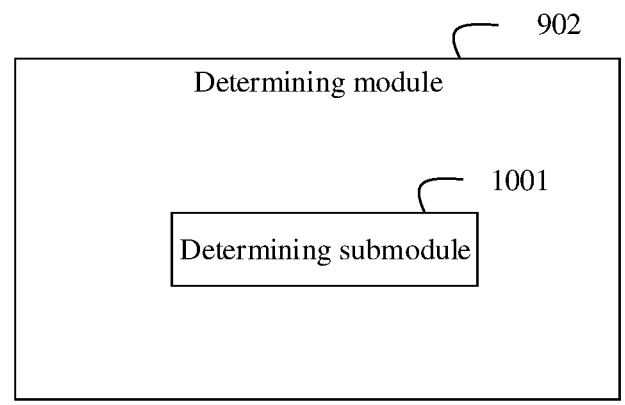
FIG. 10 is a block diagram of a determining module according to an exemplary embodiment.

As shown in FIG. 10, the determining module 902 may include a determining submodule 1001.

The determining submodule 1001 is configured to determine a target cell and a corresponding target BWP based on the local UE ID and the load balancing factors of each BWP.

In an embodiment, the load balancing factors may include load balancing factors of respective BWPs of at least two cells. The determining submodule 1001 is configured to determine a sum of the load balancing factors of respective BWPs of each cell, determine the target cell based on the sum of the load balancing factors of respective BWPs of each cell, and determine the target BWP in the target cell based on the local UE ID and the load balancing factors of respective BWPs of the target cell.

Figure 11:
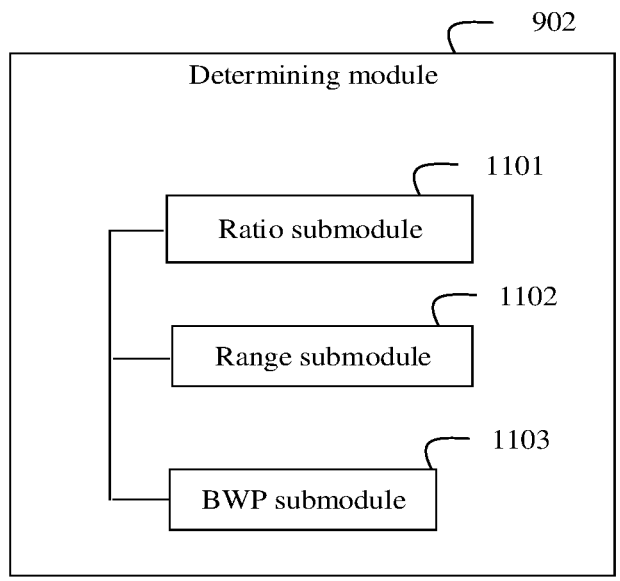
FIG. 11 is a block diagram of a determining module according to an exemplary embodiment.

In an embodiment, as shown in FIG. 11, the determining module 902 includes: a ratio submodule 1101, a range submodule 1102 and a BWP submodule 1103.

The ratio submodule 1101 is configured to determine a ratio of load balancing factors of each BWP to a sum of the load balancing factors.

The range submodule 1102 is configured to determine multiple value ranges of UE IDs according to the ratio of each BWP.

The BWP submodule 1103 is configured to determine the target BWP based on a value range to which the local UE ID belongs.

In an embodiment, the system message may further include corresponding relationships between the load balancing factors of each BWP and the value ranges of the UE IDs.

The range submodule 1102 may determine multiple value ranges of the UE IDs according to the corresponding relationships between the load balancing factors of each BWP and the value ranges of the UE IDs, and the ratio of each BWP.

In an embodiment, the system message may further include a first indication bit configured to indicate whether it is needed to wait for a notification from paging signaling for redistribution.

Figure 12:
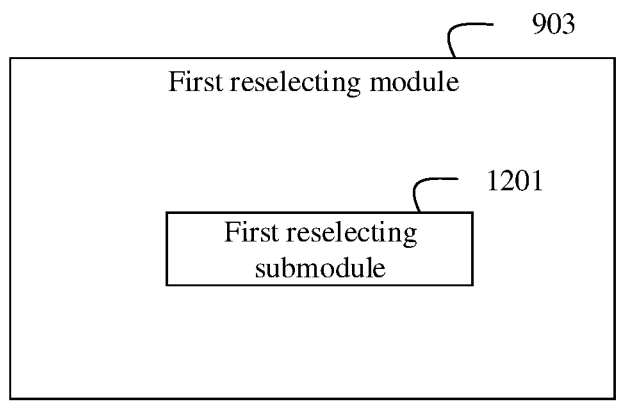
FIG. 12 is a block diagram of a first reselecting module according to an exemplary embodiment.

As shown in FIG. 12, the first reselecting module 903 may include a first reselecting submodule 1201.

The first reselecting submodule 1201 is configured to, when the first indication bit indicates that it is needed to wait for a notification from paging signaling for redistribution, select the target BWP based on reselection after the paging signaling is received.

In an embodiment, the paging signaling may include a second indication bit configured to indicate whether to carry out redistribution; and the paging signaling may further include a third indication bit configured to indicate whether to carry out the redistribution with a BWP level.

Figure 13:
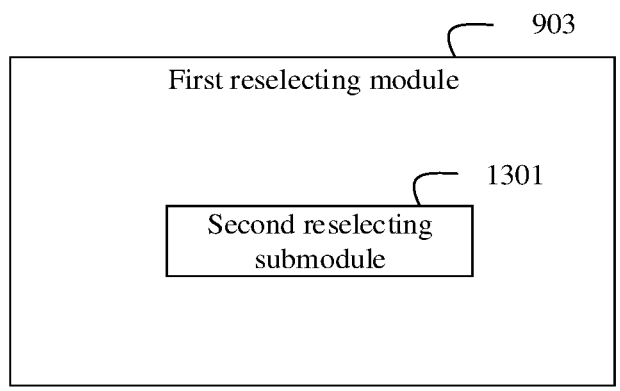
FIG. 13 is a block diagram of a first reselecting module according to an exemplary embodiment.

As shown in FIG. 13, the first reselecting module 903 may include a second reselecting submodule 1301.

The second reselecting submodule 1301 is configured to, when the second indication bit indicates that redistribution is to be carried out and the third indication bit indicates that the redistribution is to be carried out with the BWP level, select the target BWP based on reselection.

Figure 14:
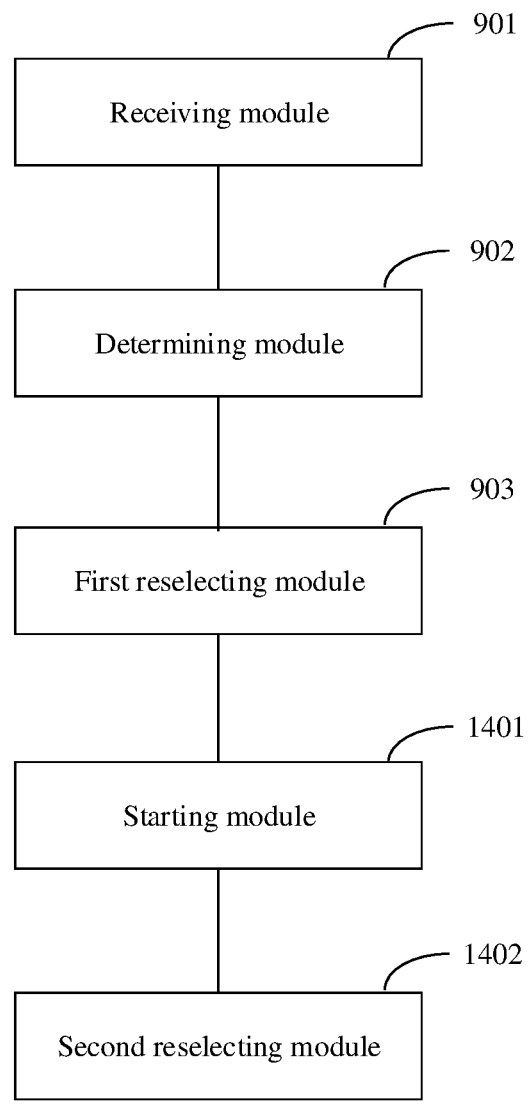
FIG. 14 is a block diagram of a device for transmitting load balancing factors according to an exemplary embodiment.

In an embodiment, as shown in FIG. 14, the device may further include a starting module 1401 and a second reselecting module 1402.

The starting module 1401 is configured to start a preset timer.

The second reselecting module 1402 is configured to, before the timer times out, take the target BWP as a target BWP for reselection when reselection is needed again.

In an embodiment, the system message may further include a CGI of a cell.

In an embodiment, the system message may further include frequency information corresponding to each BWP.

In an embodiment, the frequency information may at least include one of the following:
- an ARFCN;
- a first offset value relative to a center frequency of a corresponding cell; or
- a second offset value relative to a frequency of the system message.

In an embodiment, the system message may further include corresponding relationships between the load balancing factors of each BWP and value ranges of UE IDs.

With respect to the apparatus in the above embodiment, the specific manners for performing operations for individual modules therein have been described in detail in the embodiment regarding the method, which will not be elaborated herein.

Figure 15:
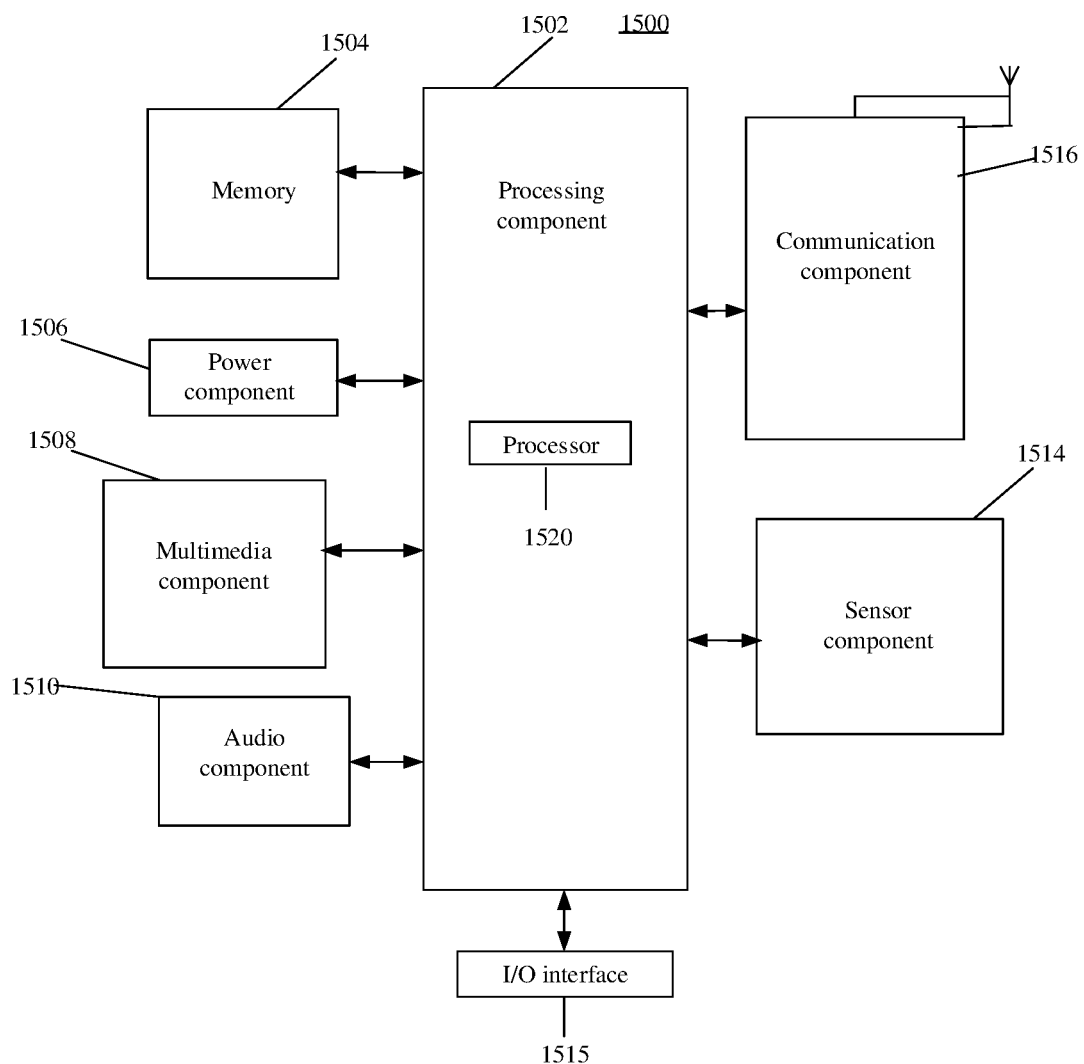
FIG. 15 is a block diagram of a device suitable for transmitting load balancing factors according to an exemplary embodiment.

FIG. 15 is a block diagram of a device suitable for transmitting load balancing factors according to an exemplary embodiment. For example, the device 1500 may be a mobile phone, a computer, a digital broadcast terminal, a messaging device, a gaming console, a tablet, a medical device, exercise equipment and a personal digital assistant.

The device 1500 may include one or more of the following components: a processing component 1502, a memory 1504, a power component 1506, a multimedia component 1508, an audio component 1510, an Input/Output (I/O) interface 1515, a sensor component 1514, and a communication component 1516.

The processing component 1502 typically controls overall operations of the device 1500, such as the operations associated with display, telephone calls, data communications, camera operations, and recording operations. The processing component 1502 may include one or more processors 1520 to execute instructions to carry out all or part of the operations in the above method. Moreover, the processing component 1502 may include one or more modules which facilitate interaction between the processing component 1502 and the other components. For instance, the processing component 1502 may include a multimedia module to facilitate interaction between the multimedia component 1508 and the processing component 1502.

The memory 1504 is configured to store various types of data to support the operation of the device 1500. Examples of such data include instructions for any application programs or methods operated on the device 1500, contact data, phonebook data, messages, pictures, video, etc. The memory 1504 may be implemented by any type of volatile or non-volatile memory devices, or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, and a magnetic or optical disk.

The power component 1506 provides power for various components of the device 1500. The power component 1506 may include a power management system, one or more power supplies, and other components associated with generation, management and distribution of power for the device 1500.

The multimedia component 1508 includes a screen providing an output interface between the device 1500 and a user. In some embodiments, the screen may include a Liquid Crystal Display (LCD) and a Touch Panel (TP). If the screen includes the TP, the screen may be implemented as a touch screen to receive an input signal from the user. The TP includes one or more touch sensors to sense touches, swipes and gestures on the TP. The touch sensors may not only sense a boundary of a touch or swipe action but also detect a duration and pressure associated with the touch or swipe action. In some embodiments, the multimedia component 1508 includes a front camera and/or a rear camera. The front camera and/or the rear camera may receive external multimedia data when the device 1500 is in an operation mode, such as a photographing mode or a video mode. Each of the front camera and the rear camera may be a fixed optical lens system or have focusing and optical zooming capabilities.

The audio component 1510 is configured to output and/or input an audio signal. For example, the audio component 1510 includes a Microphone (MIC), and the MIC is configured to receive an external audio signal when the device 1500 is in the operation mode, such as a call mode, a recording mode and a voice recognition mode. The received audio signal may further be stored in the memory 1504 or sent through the communication component 1516. In some embodiments, the audio component 1510 may further include a speaker configured to output the audio signal.

The I/O interface 1515 provides an interface between the processing component 1502 and a peripheral interface module, and the peripheral interface module may be a keyboard, a click wheel, a button and the like. The button may include, but not limited to: a home button, a volume button, a starting button and a locking button.

The sensor component 1514 includes one or more sensors configured to provide status assessment in various aspects for the device 1500. For instance, the sensor component 1514 may detect an on/off status of the device 1500 and relative positioning of components, such as a display and small keyboard of the device 1500, and the sensor component 1514 may further detect a change in a position of the device 1500 or a component of the device 1500, presence or absence of contact between the user and the device 1500, orientation or acceleration/deceleration of the device 1500 and a change in temperature of the device 1500. The sensor component 1514 may include a proximity sensor configured to detect presence of an object nearby without any physical contact. The sensor component 1514 may also include a light sensor, such as a Complementary Metal Oxide Semiconductor (CMOS) or Charge Coupled Device (CCD) image sensor, configured for use in an imaging application. In some embodiments, the sensor component 1514 may also include an acceleration sensor, a gyroscope sensor, a magnetic sensor, a pressure sensor or a temperature sensor.

The communication component 1516 is configured to facilitate wired or wireless communication between the device 1500 and another device. The device 1500 may access a communication-standard-based wireless network, such as a Wireless Fidelity (WiFi) network, a 2nd-Generation (2G) or 3rd-Generation (3G) network or a combination thereof. In an exemplary embodiment, the communication component 1516 receives a broadcast signal or broadcast associated information from an external broadcast management system through a broadcast channel. In an exemplary embodiment, the communication component 1516 may further include an Near Field Communication (NFC) module to facilitate short-range communication. For example, the NFC module may be implemented based on a Radio Frequency Identification (RFID) technology, an Infrared Data Association (IrDA) technology, an Ultra-WideBand (UWB) technology, a Bluetooth (BT) technology and another technology.

In an exemplary embodiment, the device 1500 may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors or other electronic components, and is configured to execute the above method.

In an exemplary embodiment, there is also provided a non-transitory computer-readable storage medium including an instruction, such as the memory 1504 including an instruction, and the instruction may be executed by the processor 1520 of the device 1500 to implement the above-mentioned method. For example, the non-transitory computer-readable storage medium may be a ROM, a Random Access Memory (RAM), a Compact Disc Read-Only Memory (CD-ROM), a magnetic tape, a floppy disc, an optical data storage device and the like.

In an exemplary embodiment, a device for transmitting load balancing factors is provided, which may include:
 a processor; and
 a memory configured to store an instruction executable for the processor.

The processor is configured to:
 receive a system message from a base station, the system message including load balancing factors of each BWP;
 determine a target BWP based on a local UE ID and the load balancing factors of each BWP; and
 select the target BWP based on reselection.

The processor may be further configured as:
 the load balancing factors at least include one of the following:
 load balancing factors of respective BWPs of a local cell;
 load balancing factors of respective BWPs of an adjacent cell with a same frequency as the local cell; or
 load balancing factors of respective BWPs of an adjacent cell with a different frequency from the local cell.

Determining the target BWP based on the local UE ID and the load balancing factors of each BWP may include:
 determining the target cell and the corresponding target BWP based on the local UE ID and the load balancing factors of each BWP.

The processor may be further configured as:
 when the load balancing factors include load balancing factors of respective BWPs of at least two cells, determining the target cell and the corresponding target BWP based on the local UE ID and the load balancing factors of each BWP may include:
 determining a sum of the load balancing factors of respective BWPs of each cell;
 determining the target cell based on the sum of the load balancing factors of respective BWPs of each cell; and
 determining the target BWP in the target cell based on the local UE ID and the load balancing factors of respective BWPs of the target cell.

The processor may be further configured as:
 determining the target BWP based on the local UE ID and the load balancing factors of each BWP may include:
 determining a ratio of load balancing factors of each BWP to a sum of the load balancing factors;
 determining multiple value ranges of UE IDs according to the ratio of each BWP; and
 determining the target BWP based on a value range to which the local UE ID belongs.

The processor may be further configured as:
 the system message may further include corresponding relationships between the load balancing factors of each BWP and the value ranges of the UE IDs.

Determining the multiple value ranges of the UE IDs according to the ratio of each BWP may include:
 determining multiple value ranges of the UE IDs according to the corresponding relationships between the load balancing factors of each BWP and the value ranges of the UE IDs, and the ratio of each BWP.

The processor may be further configured as:
 the system message may further include a first indication bit configured to indicate whether it is needed to wait for a notification from paging signaling for redistribution.

Selecting the target BWP based on reselection may include:
 when the first indication bit indicates that it is needed to wait for a notification from paging signaling for redistribution, selecting the target BWP based on reselection after the paging signaling is received.

The processor may be further configured as:
 the paging signaling includes a second indication bit configured to indicate whether to carry out redistribution; and the paging signaling may further include a third indication bit configured to indicate whether to carry out the redistribution with a BWP level.

Selecting the target BWP based on reselection may include:
 when the second indication bit indicates that redistribution is to be carried out and the third indication bit indicates that the redistribution is to be carried out with the BWP level, selecting the target BWP based on reselection.

The processor may be further configured as:
 after the target BWP is determined, the method may further include:
 staring a preset timer;
 before the timer times out, taking the target BWP as the target BWP for reselection when reselection is needed again.

The processor may be further configured as:
 the system message may further include a CGI of a cell.

The processor may be further configured as:
 the system message may further include frequency information corresponding to each BWP.

The processor may be further configured as:
 the frequency information may at least include one of the following:
 an ARFCN;
 a first offset value relative to a center frequency of a corresponding cell; or
 a second offset value relative to a frequency of the system message.

A computer-readable storage medium is provided. When an instruction in the storage medium is executed by a processor of the device, the device can execute the method for transmitting load balancing factors. The method may include:
 receiving a system message from a base station, the system message including load balancing factors of each BWP;
 determining a target BWP based on a local UE ID and the load balancing factors of each BWP; and
 selecting the target BWP based on reselection.

The instruction in the storage medium may also include that:
 the load balancing factors at least include one of the following:
 load balancing factors of respective BWPs of a local cell;
 load balancing factors of respective BWPs of an adjacent cell with a same frequency as the local cell; or
 load balancing factors of respective BWPs of an adjacent cell with a different frequency from the local cell.

Determining the target BWP based on the local UE ID and the load balancing factors of each BWP may include:

determining the target cell and the corresponding target BWP based on the local UE ID and the load balancing factors of each BWP.

The instruction in the storage medium may also include that:

when the load balancing factors include load balancing factors of respective BWPs of at least two cells, determining that target cell and the corresponding target BWP based on the local UE ID and the load balancing factors of each BWP may include:

determining a sum of load balancing factors of respective BWPs of each cell;

determining the target cell based on the sum of the load balancing factors of respective BWPs of each cell; and determining the target BWP in the target cell based on the local UE ID and the load balancing factors of respective BWPs of the target cell.

The instruction in the storage medium may also include that:

determining the target BWP based on the local UE ID and the load balancing factors of each BWP may include:

determining a ratio of load balancing factors of each BWP to a sum of the load balancing factors;

determining multiple value ranges of the UE IDs according to the ratio of each BWP; and determining the target BWP based on a value range to which the local UE ID belongs.

The instruction in the storage medium may also include that:

the system message may further include corresponding relationships between the load balancing factors of each BWP and the value ranges of the UE IDs.

Determining the multiple value ranges of the UE ID according to the ratio of each BWP may include:

determining multiple value ranges of the UE IDs according to the corresponding relationships between the load balancing factors of each BWP and the value ranges of the UE IDs, and the ratio of each BWP.

The instruction in the storage medium may also include that:

the system message may further include a first indication bit configured to indicate whether it is needed to wait for a notification from paging signaling for redistribution.

Selecting the target BWP based on reselection may include:

when the first indication bit indicates that it is needed to wait for a notification from paging signaling for redistribution, selecting the target BWP based on reselection after the paging signaling is received.

The instruction in the storage medium may also include that:

the paging signaling may include a second indication bit configured to indicate whether to carry out redistribution; and the paging signaling may further include a third indication bit configured to indicate whether to carry out the redistribution with a BWP level.

Selecting the target BWP based on reselection may include:

when the second indication bit indicates that redistribution is to be carried out, and the third indication bit indicates that the redistribution is to be carried out with the BWP level, selecting the target BWP based on reselection.

The instruction in the storage medium may also include that:

after the target BWP is determined, the method may further include:

starting a preset timer; and before the timer times out, taking the target BWP as the target BWP for reselection when reselection is needed again.

The instruction in the storage medium may also include that:

the system message may further include a CGI of a cell.

The instruction in the storage medium may also include that:

the system message may further include frequency information corresponding to each BWP.

The instruction in the storage medium may also include that:

the frequency information may at least include one of the following:

an ARFCN;

a first offset value relative to a center frequency of a corresponding cell; or a second offset value relative to a frequency of the system message.

Figure 16:
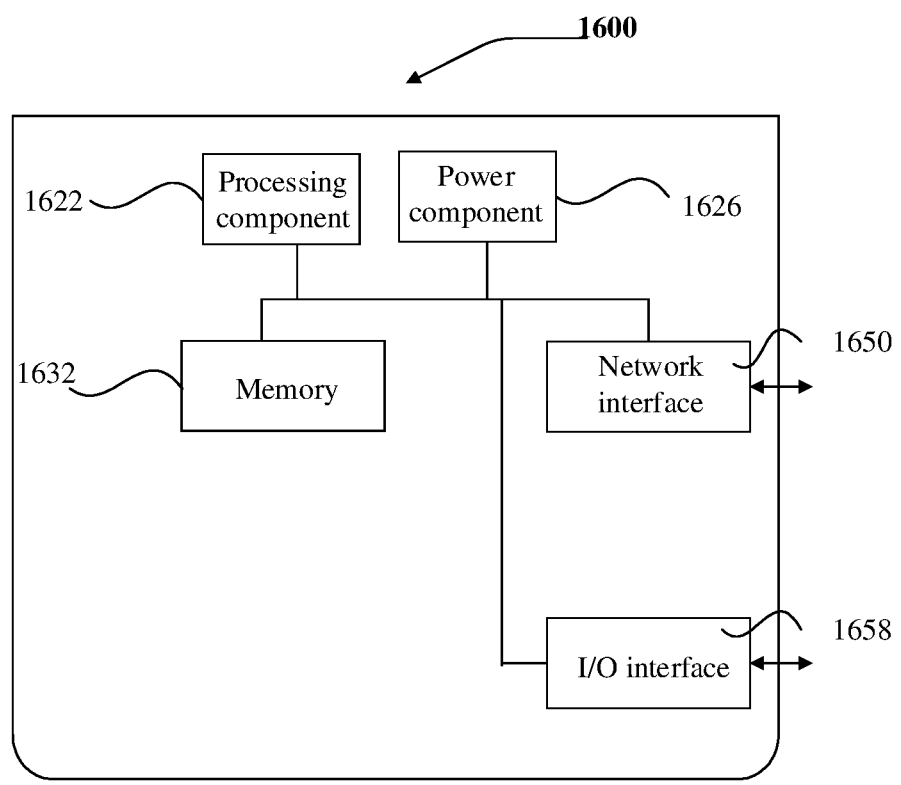
FIG. 16 is a block diagram of a device suitable for transmitting load balancing factors according to an exemplary embodiment.

FIG. 16 is a block diagram of a device 1600 for synchronizing data according to an exemplary embodiment. For example, the device 1600 may be provided as a computer. Referring to FIG. 16, the device 1600 includes a processing component 1622, further including one or more processors, and a memory resource represented by a memory 1632, configured to store an instruction executable for the processing component 1622, for example, an APP. The APP stored in the memory 1632 may include one or more than one module of which each corresponds to a set of instructions. In addition, the processing component 1622 is configured to execute an instruction to execute a method for synchronizing data.

The device 1600 may further include a power component 1626 configured to execute power management of the device 1600, a wired or wireless network interface 1650 configured to connect the device 1600 to a network and an I/O interface 1658. The device 1600 may be operated based on an operating system stored in the memory 1632, for example, Windows Server™, Mac OS X™, Unix™, Linux™, FreeBSD™ or the like.

In an exemplary embodiment, a device for transmitting load balancing factors is provided, which may include:

a processor; and a memory configured to store an instruction executable for the processor.

The processor is configured to:

generate a system message, the system message including load balancing factors of each BWP; and send the system message by broadcasting.

The processor may be further configured as:

the load balancing factors at least include one of the following:

load balancing factors of respective BWPs of a local cell;

load balancing factors of respective BWPs of an adjacent cell with a same frequency as the local cell; or load balancing factors of respective BWPs of an adjacent cell with a different frequency from the local cell.

The processor may be further configured as:

the system message may further include a CGI of a cell.

The processor may be further configured as:

the system message may further include frequency information corresponding to each BWP.

The processor may be further configured as:

the frequency information may at least include one of the following:
an ARFCN;
a first offset value relative to a center frequency of a corresponding cell; and
a second offset value relative to a frequency of the system message.

The processor may be further configured as:
the system message may further include corresponding relationships between the load balancing factors of each BWP and the value ranges of the UE IDs.

The processor may be further configured as:
the system message may further include a first indication bit configured to indicate whether it is needed to wait for a notification from paging signaling for redistribution.

The processor may be further configured as:
the method may further include:
sending paging signaling, the paging signaling including a second indication bit configured to indicate whether to carry out redistribution.

The processor may be further configured as:
when the second indication bit indicates that redistribution is to be carried out, the paging signaling may further include a third indication bit configured to indicate whether to carry out the redistribution with a BWP level.

A computer-readable storage medium is provided. When an instruction in the storage medium is executed by a processor of the device, the device can execute the method for transmitting load balancing factors. The method may include the following operations.

A system message is generated, the system message including load balancing factors of each BWP.

The system message is sent by broadcasting.

The instruction in the storage medium may also include that:
the load balancing factors at least include one of the following:
load balancing factors of respective BWPs of a local cell;
load balancing factors of respective BWPs of an adjacent cell with a same frequency as the local cell; or
load balancing factors of respective BWPs of an adjacent cell with a different frequency from the local cell.

The instruction in the storage medium may also include that:
the system message may further include a CGI of a cell.

The instruction in the storage medium may also include that:
the system message may further include frequency information corresponding to each BWP.

The instruction in the storage medium may also include that:
the frequency information may at least include one of the following:
an ARFCN;
a first offset value relative to a center frequency of a corresponding cell; or
a second offset value relative to a frequency of the system message.

The instruction in the storage medium may also include that:
the system message may further include corresponding relationships between the load balancing factors of each BWP and the value ranges of the UE IDs.

The instruction in the storage medium may also include that:
the system message may further include a first indication bit configured to indicate whether it is needed to wait for a notification from paging signaling for redistribution.

The instruction in the storage medium may also include that:
the method may further include:
sending paging signaling, the paging signaling including a second indication bit configured to indicate whether to carry out redistribution.

The instruction in the storage medium may also include that:
when the second indication bit indicates that redistribution is to be carried out, the paging signaling may further include a third indication bit configured to indicate whether to carry out the redistribution with a BWP level.

Other implementation solutions of the present disclosure will be apparent to those skilled in the art from consideration of the specification and practice of the present disclosure. The application is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes may be made without departing from the scope thereof. It is intended that the scope of the present disclosure only be limited by the appended claims.

What is claimed is:

1. A method for transmitting load balancing factors, applied to a base station, comprising:
   generating a system message, the system message comprising load balancing factors of each Bandwidth Part (BWP); and
   sending the system message by broadcasting to a User Equipment (UE) to determine a target BWP based on a local UE Identity (ID) and the load balancing factors of each BWP and select the target BWP based on reselection,
   wherein the system message further comprises corresponding relationships between the load balancing factors of each BWP and value ranges of UE IDs.

2. The method of claim 1, wherein the load balancing factors at least comprise one of:
   load balancing factors of respective BWPs of a local cell;
   load balancing factors of respective BWPs of an adjacent cell with a same frequency as the local cell; or
   load balancing factors of respective BWPs of an adjacent cell with a different frequency from the local cell.

3. The method of claim 1, wherein the system message further comprises at least one of:
   a Cellular Global Identity (CGI); or
   frequency information corresponding to each BWP.

4. The method of claim 3, wherein the frequency information at least comprises one of:
   an Absolute Radio Frequency Channel Number (ARFCN);
   a first offset value relative to a center frequency of a corresponding cell; or a second offset value relative to a frequency of the system message.

5. The method of claim 1, wherein the system message further comprises a first indication bit configured to indicate whether it is needed to wait for a notification from paging signaling for redistribution.

6. The method of claim 5, further comprising:
sending paging signaling after sending the system message by broadcasting, the paging signaling comprising a second indication bit configured to indicate whether to carry out redistribution.

7. The method of claim 6, wherein when the second indication bit indicates that the redistribution is to be carried out, the paging signaling further comprises a third indication bit configured to indicate whether to carry out the redistribution with a BWP level.

8. A device for transmitting load balancing factors, comprising:
a processor; and
a memory configured to store an instruction executable for the processor;
wherein, the processor is configured to implement operations of the method of claim 1.

9. A method for transmitting load balancing factors, applied to a User Equipment (UE), comprising:
receiving a system message from a base station, the system message comprising load balancing factors of each Bandwidth Part (BWP);
determining a target BWP based on a local UE Identity (ID) and the load balancing factors of each BWP; and
selecting the target BWP based on reselection,
wherein the system message further comprises corresponding relationships between the load balancing factors of each BWP and value ranges of UE IDs.

10. The method of claim 9, wherein the load balancing factors at least comprise one of:
load balancing factors of respective BWPs of a local cell;
load balancing factors of respective BWPs of an adjacent cell with a same frequency as the local cell; or
load balancing factors of respective BWPs of an adjacent cell with a different frequency from the local cell;
determining the target BWP based on the local UE ID and the load balancing factors of each BWP comprises:
determining a target cell and the target BWP based on the local UE ID and the load balancing factors of each BWP.

11. The method of claim 10, wherein when the load balancing factors comprise load balancing factors of respective BWPs of at least two cells, determining the target cell and the target BWP based on the local UE ID and the load balancing factors of each BWP comprises:
determining a sum of the load balancing factors of respective BWPs of each cell;
determining the target cell based on the sum of the load balancing factors of respective BWPs of each cell; and
determining the target BWP in the target cell based on the local UE ID and the load balancing factors of respective BWPs of the target cell.

12. The method of claim 9, wherein determining the target BWP based on the local UE ID and the load balancing factors of each BWP comprises:
determining a ratio of the load balancing factors of each BWP to a sum of the load balancing factors;
determining multiple value ranges of the UE IDs according to the ratio of the load balancing factors of each BWP; and
determining the target BWP based on a value range to which the local UE ID belongs.

13. The method of claim 12, wherein
determining the multiple value ranges of the UE IDs according to the ratio of the load balancing factors of each BWP comprises:
determining the multiple value ranges of the UE IDs according to the corresponding relationships between the load balancing factors of each BWP and the value ranges of the UE IDs, and the ratio of the load balancing factors of each BWP.

14. The method of claim 9, wherein the system message further comprises a first indication bit configured to indicate whether it is needed to wait for a notification of paging signaling for redistribution;
selecting the target BWP based on reselection comprises:
when the first indication bit indicates that it is needed to wait for a notification from paging signaling for redistribution, selecting the target BWP based on reselection after receiving the paging signaling.

15. The method of claim 14, wherein the paging signaling comprises a second indication bit configured to indicate whether to carry out redistribution, and further comprises a third indication bit configured to indicate whether to carry out the redistribution with a BWP level;
selecting the target BWP based on reselection comprises:
when the second indication bit indicates that redistribution is to be carried out, and the third indication bit indicates that the redistribution is to be carried out with the BWP level, selecting the target BWP based on reselection.

16. The method of claim 9, further comprising:
starting a preset timer after determining the target BWP; and
before the timer times out, taking the target BWP as the target BWP for reselection when reselection is needed again.

17. The method of claim 9, wherein the system message further comprises at least one of:
a Cellular Global Identity (CGI); or
frequency information corresponding to each BWP.

18. The method of claim 17, wherein the frequency information at least comprises one of:
an Absolute Radio Frequency Channel Number (ARFCN);
a first offset value relative to a center frequency of a corresponding cell; or
a second offset value relative to a frequency of the system message.

19. A device for transmitting load balancing factors, comprising:
a communication component, configured to facilitate wired or wireless communication between the device and another device;
a processor, connected to the communication component; and
a memory, connected to the processor and configured to store an instruction executable for the processor;
wherein, the processor is configured to:
receive, through the communication component, a system message from a base station, the system message comprising load balancing factors of each Bandwidth Part (BWP);
determine a target BWP based on a local UE Identity (ID) and the load balancing factors of each BWP; and
select the target BWP based on reselection, wherein the system message further comprises corresponding relationships between the load balancing factors of each BWP and value ranges of UE IDs.

* * * * *